United States Patent

Spangler et al.

[15] 3,662,459

[45] May 16, 1972

[54] METHOD FOR TUNING DISCRIMINATORS

[72] Inventors: Frederick E. Spangler; Daniel L. Wetherell, both of Lynchburg, Va.

[73] Assignee: General Electric Company

[22] Filed: Apr. 1, 1970

[21] Appl. No.: 24,723

[52] U.S. Cl. ....................29/593, 29/574, 329/117

[51] Int. Cl. ....................H03j 3/12

[58] Field of Search ....................29/592, 593, 574; 329/117, 329/110, 140, 198

[56] References Cited

UNITED STATES PATENTS

| | | | |
|---|---|---|---|
| 3,487,318 | 12/1969 | Herman | 329/117 |
| 3,525,944 | 8/1970 | Smith | 329/140 |

*Primary Examiner*—J. Spencer Overholser
*Assistant Examiner*—Norman E. Lehrer
*Attorney*—James J. Williams, Frank L. Neuhauser, Oscar B. Waddell and Joseph B. Forman

[57] ABSTRACT

In a discriminator that utilizes one or more piezoelectric crystals, the crystals are tuned to resonate at a desired frequency after being connected in the discriminator, since the capacity of the discriminator components is not determinable prior to being used. The tuning includes frequency modulating a carrier signal of the desired frequency with a selected sinusoidal signal, and applying this frequency-modulated signal to the discriminator. Each crystal is then respectively tuned (such as by plating) to resonate at the desired frequency. Resonance is indicated when the discriminator output signal is approximately twice the sinusoidal modulating frequency.

5 Claims, 7 Drawing Figures

INVENTORS:
FREDERICK E. SPANGLER,
DANIEL L. WETHERELL,
BY James J. Williams
THEIR ATTORNEY.

INVENTORS
FREDERICK E. SPANGLER,
DANIEL L. WETHERELL,

BY James J. Williams
THEIR ATTORNEY.

METHOD FOR TUNING DISCRIMINATORS

BACKGROUND OF THE INVENTION

Our invention relates to an improved method of manufacturing discriminators, and particularly to a method for tuning a piezoelectric crystal after it is assembled in a discriminator with circuit components whose capacity is not determinable prior to being used.

In the commonly assigned co-pending patent application entitled "Frequency Discriminator", filed Mar. 6, 1970 by Junior I. Rhodes, Ser. No. 17,249, a new and improved discriminator utilizing piezoelectric crystals and diode rectifiers is described. While that discriminator is relatively small, lends itself to microelectronic techniques, and has good characteristics, it does present a problem in its manufacture. This problem results from the fact that the crystals in the discriminator must be resonant at a desired or selected frequency. The resonant frequency depends, at least in part, on the capacity of certain circuit components, such as the diode rectifiers. However, the diode rectifiers used in the discriminator have a capacity which, because of manufacturing tolerances or different operating conditions and frequencies, is not determinable prior to being used. Only after the discriminator circuit is completed does this capacity (whatever it may be) become determined and the crystal resonant frequency fixed. Thus, it is impossible to know what the crystal resonant frequency should be until the discriminator is completed, after which it is necessary that the crystal be tuned to resonate at the desired frequency.

Accordingly, an object of our invention is to provide a new method for manufacturing discriminators which use piezoelectric crystals and diode rectifiers.

Another object of our invention is to provide an improved method for tuning a piezoelectric crystal to resonate at a selected frequency after the crystal is assembled in a discriminator.

Another object of our invention is to provide an improved method for tuning piezoelectric crystals in a discriminator having diode rectifiers whose capacity is indeterminable or unknown prior to assembly, so that the discriminator has the desired frequency response.

SUMMARY OF THE INVENTION

Briefly, these and other objects are achieved in accordance with our invention by the application of a carrier signal of the desired frequency to the input of an assembled discriminator. The carrier signal is frequency-modulated by a sinusoidal signal of a suitable frequency, for example 1,000 hertz. The discriminator output is applied to an indicator, such as a cathode ray oscilloscope. With the modulated carrier applied, each crystal is tuned (usually in a downward frequency direction by plating) until the discriminator output is substantially a symmetrical sine wave having a frequency twice the modulating frequency. (For the 1,000 hertz modulating frequency, the output frequency would be 2,000 hertz.) When this output is obtained, the crystal is resonant at the desired frequency. We have found that this method is relatively simple and reliable, and provides a discriminator that has the desired characteristics.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF THE PREFERRED EMBODIMENT

Figure 1:
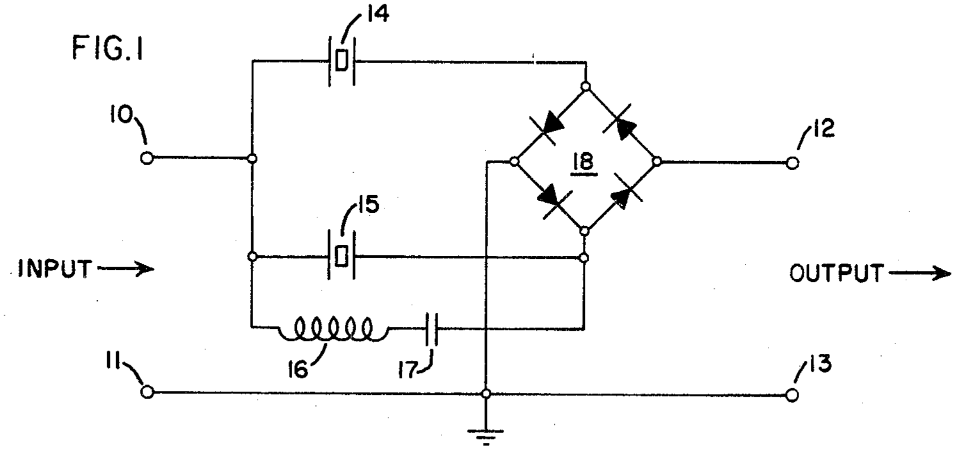
FIG. 1 shows a circuit diagram of a discriminator having piezoelectric crystals which are to be tuned to resonate at a selected frequency.
Figure 2:
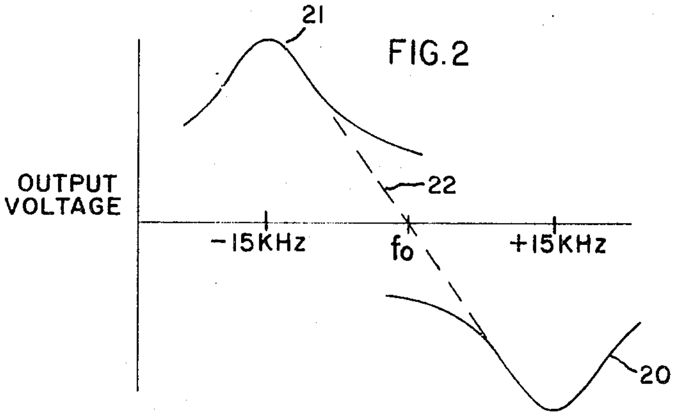
FIG. 2 shows the output voltage as a function of frequency of a discriminator such as that shown in FIG. 1.

FIG. 1 shows a circuit diagram of the discriminator described in the above-mentioned co-pending patent application. This discriminator comprises two input terminals 10, 11 to which a frequency-modulated signal is applied. Typically, this frequency-modulated signal has a selected center or carrier frequency that is varied by lower frequency-modulating signals. The discriminator produces an output signal, representing the modulating signals, at two output terminals 12, 13. The discriminator comprises two piezoelectric crystals 14, 15 which are respectively tuned to resonate at a frequency that is higher than and lower than the selected center or carrier frequency. The lower frequency crystal 15 is preferably shunted by a serially connected inductor 16 and capacitor 17. The crystals 14, 15 are connected to a bridge rectifier 18 which, in the circuit of FIG. 1, comprises four diode rectifiers connected so as to provide a voltage-doubled output. The discriminator, as shown and described, provides a good operation and a relatively linear response. A typical response is shown in FIG. 2, where it is assumed that the crystals 14, 15 are respectively tuned to resonate at frequencies that are 15 kilohertz above and 15 kilohertz below the carrier frequency $f_0$. The responses of the individual crystals 14, 15 are respectively illustrated by the curves 20, 21. The total response of the discriminator includes portions of the solid line curves 20, 21 and the dashed line 22, as is known to persons skilled in the art.

In order that the discriminator of FIG. 1 be properly and symmetrically responsive to frequency-modulated signals, the crystals 14, 15 should be respectively resonant at a frequency higher than the carrier frequency and a frequency lower than the carrier frequency, preferably by equal amounts. As will be apparent to persons skilled in the discriminator art, the capacity of certain circuit components affects the resonant response of the crystals 14, 15. Therefore, if the proper discriminator response is to be provided, the resonant frequency of the crystals 14, 15 must be adjusted to take this circuit capacity into consideration. In the circuit of FIG. 1, the diode rectifiers forming the bridge 18 probably account for most of the circuit capacity affecting the crystals 14, 15. Since these rectifiers are manufactured with some degree of tolerance, the capacity of any one rectifier may fall anywhere in the range representing this tolerance. Thus, the actual rectifier capacity does not become known until the rectifier is actually connected into the discriminator and signals are applied. Hence, it becomes necessary that the piezoelectric crystals 14, 15 be tuned after the circuit in the discriminator is completed. As far as we are aware, there is no previously known method for tuning piezoelectric crystals connected in a discriminator.

Figure 3:
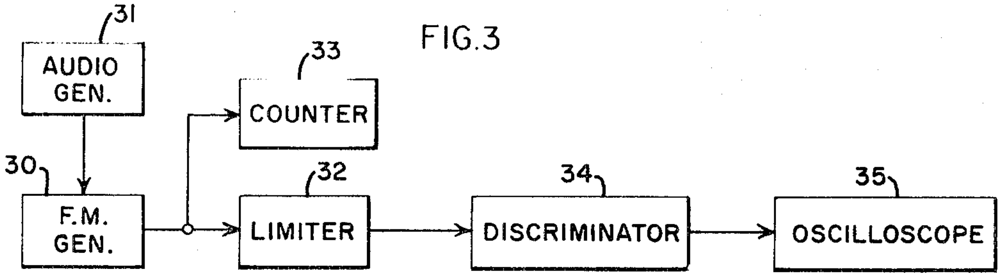
FIG. 3 shows a block diagram of the apparatus for tuning a crystal in a discriminator in accordance with our invention.

FIG. 3 shows a block diagram of the apparatus which can be utilized to follow the method for making discriminators in accordance with our invention. This apparatus comprises a frequency-modulated (FM) generator 30 and an audio-frequency generator 31. The generator 30 produces carrier signals which are frequency-modulated by audio signals (preferably sinusoidal) from the generator 31. These frequency-modulated signals are applied to an amplitude limiter 32 and also to a suitable frequency indicator or counter 33. The output of the limiter 32 is applied to a completed discriminator 34 (such as shown in FIG. 1) which is to be tuned in accordance with our invention. The output from the discriminator 34 is applied to a suitable indicating device, such as a cathode ray oscilloscope 35. The method for tuning the discriminator 34 will be described in more detail, but briefly comprises the steps of applying the frequency-modulated signal to the completed discriminator 34, and varying the resonant frequency of each of the crystals in the discriminator while observing the cathode ray oscilloscope 35 until an output (typically at an audio frequency), having a frequency twice the modulating frequency, is obtained.

As a typical example for explaining our tuning method, it has been assumed that a discriminator such as shown in FIG. 1 is to be tuned to operate at a center or carrier frequency $f_0$ of 20 megahertz. This explanation is given in connection with the voltage-frequency curves or waveforms of FIGS. 4(*a*) through 4(*d*). In the assumed example, the two discriminator crystals are to be tuned to resonate at +15 kilohertz above 20 megahertz, and −15 kilohertz below 20 megahertz respectively so as to supply the desired bandwidth. We prefer that these crystals have a slight deficiency of plating material so that their initial resonant frequencies are respectively higher than the desired final resonant frequencies. This is done so as to permit additional plating material to be added, thereby lowering the resonant frequencies to the desired value. The amount of the deficiency can be determined by trial and error. As shown by the curve 41 in FIG. 4(*a*), the higher frequency crystal may have an initial resonant frequency that is at +16 kilohertz above $f_0$ (i.e., at 20.016 megahertz); and as shown by the curve 45 in FIG. 4(*c*), the lower frequency crystal may have an initial resonant frequency that is at −14 kilohertz below $f_0$ (i.e., at 19.986 megahertz). The waveforms shown in FIGS. 4(*a*) through 4(*d*) are obtained when the carrier frequency is frequency-modulated by the 1,000 hertz sinusoidal signal, shown below FIG. 4(*d*) with its frequency axis vertical. For the higher frequency crystal, a signal of 20.015 megahertz is frequency-modulated by the 1,000 hertz sinusoidal signal, and applied to the discriminator. The discriminator produces an output shown by the waveform 42 in FIG. 4(*a*). An operator observing an oscilloscope will see this waveform 42, and will know that the resonant frequency of the higher frequency crystal must be lowered. The operator can lower this resonant frequency by adding plating material, either while the crystal is positioned in the discriminator or after removing the crystal from the discriminator. After plating, the crystal is tested in the discriminator, and its response observed. The process is continued until the crystal resonant frequency is centered at 20.015 megahertz as shown by the curve 43 in FIG. 4(*b*). As we have found, this will be known because the discriminator output will be a generally symmetrical sine wave having a frequency that is approximately twice the audio-modulating frequency of 1,000 hertz, as shown by the waveform 44 in FIG.4(*b*). The reason for this is apparent from an examination of FIG. 4(*b*), where it will be seen that the 1,000 hertz audio signal swings on both sides of the response curve 43 so that the frequency of the output waveform 44 is doubled (i.e., 2,000 hertz). Thus, when an output waveform that is generally symmetrical and twice the audio-modulating frequency is obtained, the operator knows that the higher frequency crystal is properly tuned. Then, the operator can tune the lower frequency crystal.

Figures 4A, 4B, 4C, 4D:
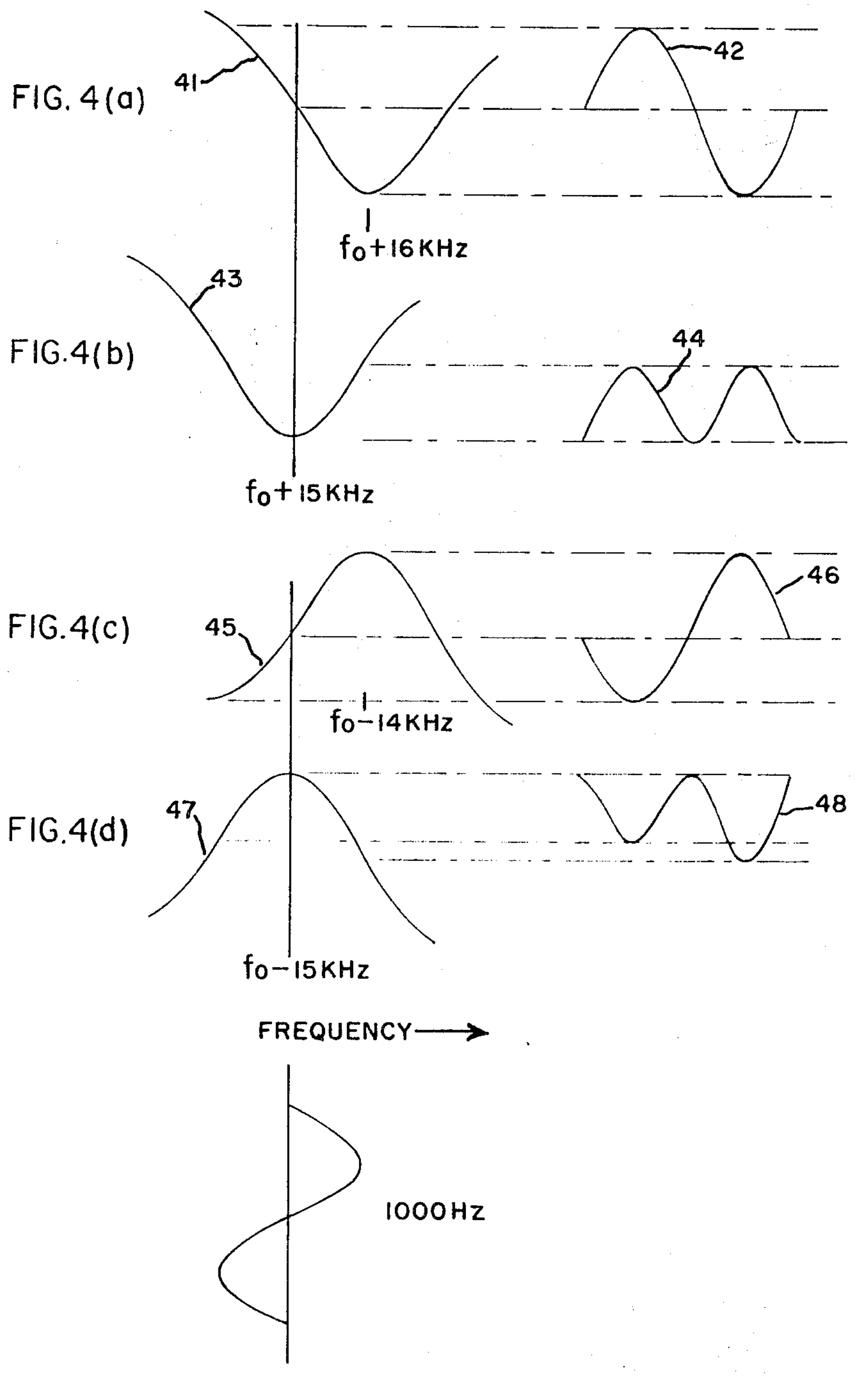
FIGS. 4(*a*) through 4(*d*) show voltage-frequency curves illustrating the discriminator operation when a crystal is tuned in accordance with our invention.

As mentioned, the initial resonant frequency of the lower frequency crystal is also preferably higher than the final desired frequency. This is shown in FIG. 4(*c*) by the curve 45 which is centered 14 kilohertz below $f_0$ (i.e., at 19.986 megahertz). A signal of 19.985 megahertz is frequency-modulated with the 1,000 hertz sinusoidal signal and applied to the discriminator. The discriminator produces an output shown by the waveform 46 in FIG. 4(*c*). The operator then lowers the resonant frequency of the lower frequency crystal by adding plating material until it is resonant at 19.985 megahertz. This condition is illustrated by the curve 47 in FIG. 4(*d*). The operator can tell when this condition is obtained because the discriminator output waveform 48 is generally symmetrical and has a frequency that is twice the audio frequency. After both crystals are tuned to the desired resonant frequencies, the discriminator will have a generally linear output over the desired bandwidth.

It will thus be seen that our invention provides a new and improved method for tuning and manufacturing discriminators which utilize piezoelectric crystals. More specifically, our invention provides a new and improved method for tuning piezoelectric crystals in discriminators so as to compensate for circuit capacities (particularly in diode rectifiers) which are indeterminable ahead of time. While we have shown our method used in a specific discriminator circuit, persons skilled in the art will appreciate that our method can be used in different discriminator circuits utilizing piezoelectric crystals with unknown circuit capacities, and with different frequencies. It is also possible to tune the crystals upward in frequency, as similar outputs can be observed with the knowledge that the desired resonant frequency will be reached when the output is a generally symmetrical wave having twice the modulating frequency. Other output indicators might also be used in place of an oscilloscope. Therefore, while our invention has been described with reference to a particular embodiment, it is to be understood that modifications may be made without departing from the spirit of the invention or from the scope of the claims.

What we claim as new and desire to secure by Letters Patent of the United States is:

1. In the manufacture of a discriminator, an improved method for adjusting the resonant frequency of a piezoelectric device to compensate for the circuit capacity, comprising the steps:
   a. supplying a carrier signal, that has the desired piezoelectric frequency and that is frequency-modulated with a lower frequency signal, to the input of said discriminator;
   b. observing the output of the said discriminator;
   c. and changing the resonant frequency of said piezoelectric device so that said output of said discriminator has a frequency that is substantially twice said lower modulating frequency.

2. The improved method of claim 1 wherein said lower frequency signal is sinusoidal.

3. The improved method of claim 1 wherein said resonant frequency of said piezoelectric device is lowered.

4. The improved method of claim 3 wherein said lower frequency signal is sinusoidal.

5. An improved method for manufacturing discriminators having at least one piezoelectric crystal connected to at least one rectifier device whose capacity is indeterminable ahead of time, said method comprising:
   a. connecting the input of said discriminator to a signal source having a center frequency substantially equal to the desired resonant frequency of said piezoelectric crystal, said signal being frequency-modulated with a single frequency sinusoidal signal
   b. connecting the output of said discriminator to a frequency indicator;
   c. and varying the resonant frequency of said piezoelectric crystal until the indicated output of said discriminator is generally symmetrical and has a frequency substantially twice the frequency of said sinusoidal signal.

* * * * *